Figure 1:
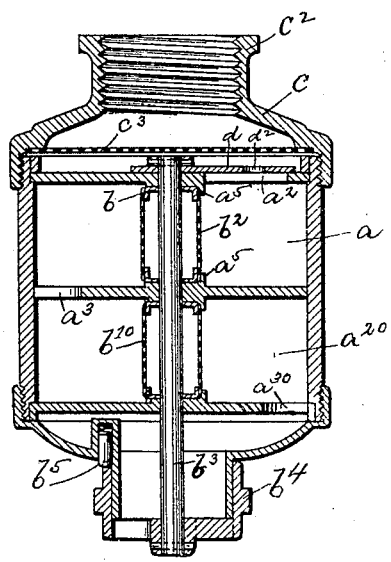

No. 773,160. PATENTED OCT. 25, 1904.
J. M. PORTER.
WATER FILTER.
APPLICATION FILED AUG. 29, 1902.
NO MODEL.

WITNESSES:
Nancy P. Ford
Mary E. Chabot

INVENTOR.
John M. Porter
by J. P. and H. P. Livermore
attys.

No. 773,160.

Patented October 25, 1904.

UNITED STATES PATENT OFFICE.

JOHN M. PORTER, OF BOSTON, MASSACHUSETTS.

WATER-FILTER.

SPECIFICATION forming part of Letters Patent No. 773,160, dated October 25, 1904.

Application filed August 29, 1902. Serial No. 121,457. (No model.)

*To all whom it may concern:*

Be it known that I, JOHN M. PORTER, of Boston, county of Suffolk, and State of Massachusetts, have invented an Improvement in Water-Filters, of which the following description, in connection with the accompanying drawings, is a specification, like letters on the drawings representing like parts.

The present invention relates to a water-filter, the object of the invention being to obtain a filter in which the water may be subjected to as many filter-screens as desired, provision being made at the same time for permitting a free flow of water to pass the filter-screens for cleansing purposes. When the filter is in condition for cleaning, the water flows past the filter-screens or filtering material, carrying away all impurities, and the construction may conveniently be such that the manipulation of a simple actuating device will at once shift the filter from its operative condition to the open condition when it is desired to clean the same.

The filter embodying the invention is not only adapted for use with individual faucets for domestic use, but may also be utilized in water plants for supply purposes, it being practicable to utilize a series of filters varying in number in accordance with the volume of water to be taken care of, which filters can be cleansed at one operation or singly, as desired, by merely shifting the filtering medium and letting the water flow freely through into any suitable waste-passage.

While a series or plurality of filters has been spoken of, it is to be understood that the only reason for such a series resides in the fact that it would probably not be the best mechanical construction to utilize one large filter, although such would be possible.

A further object of the invention is to relieve the filtering medium of the strain caused by the excess pressure exerted in opposition to the resistance of the filtering medium. In the ordinary filter now utilized for domestic purposes it is customary to subject the filtering medium to the full pressure of the water, it being obvious, therefore, that such pressure acting against the resistance of the filtering medium brings to bear upon said medium a heavy strain, so that large particles of foreign matter are forced into the filtering medium and finally disintegrate or destroy the same, thus impairing the utility of the filter. In accordance with the present invention the filter is provided with a throttling device which cuts down the pressure to an extent substantially equal to that which the filtering medium can readily sustain, so that the water, while flowing as freely as it would under any circumstances with the filter introduced, will not act with undue pressure upon the filtering material, which receives the water at a pressure substantially equal to that at which it would flow out if no throttling device were introduced.

In accordance with the invention the filtering medium, which may be wire-gauze, is normally so located in a chamber or receptacle that water entering said chamber through a suitable inlet must pass through the filtering material before leaving the chamber, there being provision, however, for a shifting of the position of the filtering material, so that the same is brought into the line of flow of the fluid, which fluid can then travel past the filtering material on all sides thereof without necessarily passing through the same. When, therefore, the position of the filtering material is shifted, the flowing liquid will thoroughly cleanse the filtering material and wash away all foreign matter which is collected thereon. At the same time it is desirable to arrange the throttling device, which is preferably used, so as to move the same when the filter is shifted to such a position that in the cleansing process the full head or pressure of water passes freely through, thus causing a more rapid and effectual cleansing operation.

The invention can conveniently be embodied in a structure in which one or more chambers may be arranged in series in the line of flow of the liquid, each chamber having an opening which is out of alinement with the opening to the next chamber and a transverse partition which constitutes the holder for the filtering material. When, therefore, the said transverse holder is in such a position as to extend across the chamber between the inlet and outlet, the water entering the chamber must pass through the filtering material before leaving the chamber, thus being subjected to the filtering process. By providing the said partition, however, with means for shifting its position in the chamber it is obvious that the said partition may be moved to a position in which it extends across the chamber in line with the inlet and the outlet, so that the water flowing through will simply flow past the partition without going through the filtering material, so that an effectual cleansing process is assured.

It is obvious that any number of chambers may be employed, it being necessary only to stagger the inlet and outlet openings, so that when the filtering-partitions lie between the openings the water must pass through the same from the inlet to the outlet, the final outlet being connected with the supply-pipe.

The throttling device may conveniently consist of a cut-off, which is adapted when the filtering-partitions are in operative position to overlie the inlet to the chamber, the said cut-off having an inlet of suitable size to permit water to flow into the chamber at such reduced pressure as may be practicable. This cut-off may be connected with the actuating device for the filter-partitions so as to be moved away from the inlet when the filter-partitions are moved to their inoperative position, so that the said inlet is open to its full extent to permit the free flow of water through the filter-shell in order to obtain the best cleansing effect.

For a water-supply plant a number of filters may be employed, and in connection with such a supply plant there may be means for disconnecting the delivery-pipe for the filtered water from the source of supply and at the same time connecting the source of supply with a waste-passage beyond each filter at the time when the filters are changed from their operative to their inoperative position, it being practicable, therefore, at intervals to shift the filters for cleansing purposes without permitting the fouled water to flow into the delivery-pipe. It is desirable in this case to arrange a number of filters in multiple, so to speak, there being a plurality of such filters interposed between the supply-pipe and the delivery-pipe, it being practicable in this way to throttle the flow of water through each filter so as to relieve undue strain upon the filtering material and at the same time to obtain a sufficient quantity of water to supply the demand.

Figure 3:
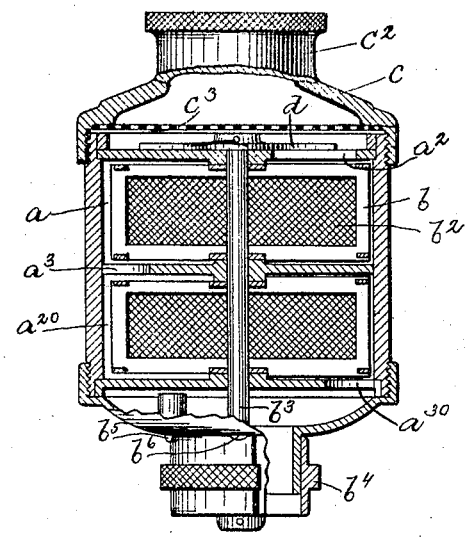
Figure 2:
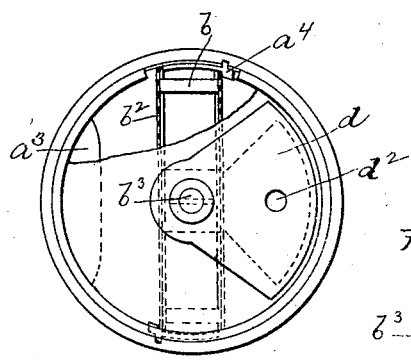
Figure 4:
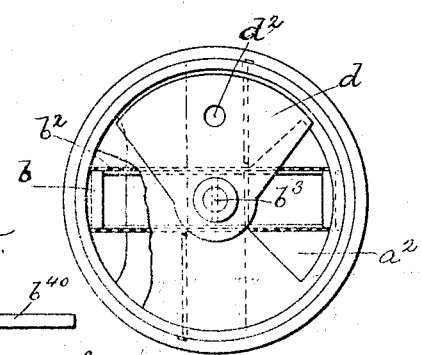
Figure 5:
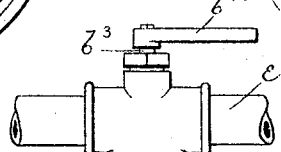
Figure 5:
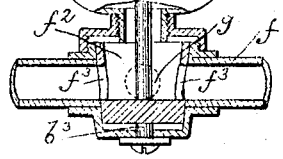

Figure 1 is a vertical section of a filter embodying the invention, showing the parts in operative position. Fig. 2 is a plan view with the upper portion of the shell removed and part broken away, the parts being shown in the same position as in Fig. 1. Fig. 3 is a view similar to Fig. 1, showing the filter with the parts in position to which they are moved for cleansing purposes; Fig. 4, a plan view similar to Fig. 2, but showing the parts in the same position as in Fig. 3; and Fig. 5 is a view partly in section showing means for utilizing the filters in connection with a water-supply system.

For convenience in illustration the invention is shown as embodied in a filter for domestic purposes adapted to be connected with an ordinary water-faucet, the device being shown as full size.

The filter embodying the invention comprises a chamber $a$, having an inlet $a^2$ and an outlet $a^3$, the inlet being in communication with the supply-pipe, the said chamber containing a filtering-partition $b$, a portion of which is of foraminous material, such as wire-gauze $b^2$, the partition being movable in the chamber so as to be interposed between the inlet and the outlet for filtering purposes or to be turned into alinement therewith, so as to be in line with the flow of fluid for cleansing purposes. The chamber $a$ may be and preferably is duplicated, the outlet $a^3$ becoming the inlet for a second chamber $a^{20}$, which in turn is provided with an outlet $a^{30}$, the said second chamber having a similar filtering-partition $b^{10}$ and the openings $a^3$ and $a^{30}$ being out of alinement with each other. It is obvious that any number of chambers may be arranged in a series in the same way. As herein shown the two chambers are formed in a single cylindrical shell provided with a coupling member $c$, which is adapted to be secured to the faucet, as by a screw-threaded neck $c^2$, through which the water enters and reaches the inlet $a^2$ to the upper chamber $a$. As herein shown a comparatively coarse strainer $c^3$ is interposed between the shell which contains the chamber and the coupling member $c$ for the purpose of intercepting any larger particles of foreign matter and preventing them from reaching the filtering-partition $b$.

The two partitions $b$ and $b^{10}$ are shown as mounted on a common stem or spindle $b^3$, which is arranged to rotate within the shell for the purpose of turning the partitions from the position shown in Figs. 1 and 2 to the position shown in Figs. 3 and 4. When thus turned, the water entering the chamber $a$ is not intercepted by the filter, but travels past the filtering material instead of through the same, thoroughly cleansing the surface of the partition and clearing away the foreign substance which has been intercepted thereby. The rod $b^3$ is shown as provided with a knob $b^4$, by means of which the rod can be turned, the said knob having a spring-retaining device $b^5$, adapted to coöperate with notches $b^6$, which come into engagement therewith when said knob is turned to either of its extreme positions.

In order to relieve the filtering material from the strain caused by its own resistance to the water flowing through, the device is provided with a throttling member $d$, which is herein shown as a plate connected with the rod $b^3$ and adapted to overlie the inlet-opening $a^2$ when the filter is in its operative position and to be removed from said opening (see Fig. 4) while the filter is being cleaned. The said member $d$ is provided with an opening $d^2$, which is of sufficient capacity to permit the water to enter the filter under such pressure as will permit the same to flow through the filtering material to the same extent as would be the case if the filtering material alone were interposed in the path of the water, so that the filter proper is relieved of the undue pressure and possible injury without lowering its capacity.

As herein shown, the partitions $b$ and $b^{10}$ are each made double and provided with two foraminous portions at opposite sides, such as wire-gauze, it being obvious that filtering material of any suitable or usual kind may be employed. As shown in Figs. 2 and 4, the partitions are made in the form of a skeleton frame open through from top to bottom, so that when the said partitions are turned into line with the flow of the water the water has access to both sides of each foraminous portion, so as to thoroughly cleanse the same. Furthermore, in the arrangement shown the inlet is wide open during the cleansing operation, so that the full head of water passes through freely, thus giving the best possible cleansing effect. The chamber is provided with ribs or shoulders $a^4$ and $a^5$, against which the partition rests when the filter is in the operative position. (Shown in Figs. 1 and 2.) This affords a practically tight joint, leaving no space or opening for the water to flow through except that afforded through the filtering material itself.

While the device thus far described is intended especially for domestic purposes, it is obvious that a filter embodying the same general construction may be used on a large scale, it being preferable in this case, however, to use a number of filters of sufficient size to collectively take care of the water-supply rather than to use one large filter, which could not be manufactured to so good an advantage.

In Fig. 5 is illustrated a portion of a system which might be utilized in which a number of filters may be employed, the said filters being interposed between a supply-pipe $e$ and a delivery-pipe $f$. In the drawings what may be termed a "multiple system" is illustrated, this probably being preferable to a series system (which of course might be employed instead) for the reason that each filter in the multiple system will receive about the same proportion of impurities, so that the cleansing process can be more readily and quickly accomplished. As indicated in Fig. 5, the delivery-pipe $f$ may be controlled by a valve $f^2$, having ports $f^3$, which when the filter is in its operative position stand in line with the delivery-pipe, so that the water flowing through the several filters will enter and flow through said delivery-pipe to the point of consumption. In conjunction with each filter, however, the delivery-pipe is shown as provided with an outlet $g$, which may be in communication with a sewer, for example, the arrangement being such that when the filter is turned to its inoperative position, as by an actuating-handle $b^{40}$, the valve $f^2$ will close the delivery-pipe $f$, at the same time bringing one of the ports $f^3$ into alinement with the outlet $g$, so that the water flowing through the filter-body to cleanse the filtering material will not enter the delivery-pipe, but will flow away as waste. In the case of a number of filters arranged in multiple, as indicated, the actuating members $b^{40}$ may, if desired, be connected together, so that all the filters in the system can be shifted at one time for cleansing purposes.

I claim—

1. A filter having filtering material, means for moving said material between a position in which it is transverse to the current and a position in which it is in line therewith, and a throttling device movable with said filtering material and interposed between the inlet to the filter and the filtering material.

2. A filter having a chamber provided with an inlet at one end and an outlet at the other, said inlet and outlet being out of alinement, a foraminous wall or partition mounted on an oscillating support within the chamber, and a throttling device also mounted on said support and coöperating with the inlet.

3. A filter having an inlet, a delivery-outlet, a waste-outlet, filtering material between said inlet and said outlet, means for moving said filtering material into the line of flow to permit a free flow past the material for cleaning purposes, and means for closing the delivery-outlet and opening the waste-outlet, as set forth.

4. A filter comprising a cylindrical shell divided transversely into chambers, an inlet to one end of each chamber at one side of the axis of said shell and an outlet from the other end of each chamber at the other side of the axis of said shell, an oscillating member extending longitudinally through the shell; and a partition of foraminous material connected with said member and extending therefrom to the sides of the shell.

In testimony whereof I have signed my name to this specification in the presence of two subscribing witnesses.

JOHN M. PORTER.

Witnesses:
  NANCY P. FORD,
  HENRY J. LIVERMORE.